(12) United States Patent
Anderson et al.

(10) Patent No.: US 10,970,937 B2
(45) Date of Patent: Apr. 6, 2021

(54) TECHNOLOGIES FOR VIRTUAL ATTRIBUTE ASSIGNMENT REFERENCING REAL OBJECTS

(71) Applicant: Intel Corporation, Santa Clara, CA (US)

(72) Inventors: Glen J. Anderson, Beaverton, OR (US); Carl Marshall, Portland, OR (US); John Sherry, Portland, OR (US); Rebecca Chierichetti, Brookings, OR (US); Ankur Agrawal, Portland, OR (US); Meng Shi, Hillsboro, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/971,554

(22) Filed: May 4, 2018

(65) Prior Publication Data

US 2019/0043267 A1 Feb. 7, 2019

(51) Int. Cl.
| | |
|---|---|
| *G06T 19/20* | (2011.01) |
| *G06T 19/00* | (2011.01) |
| *G06F 1/16* | (2006.01) |
| *G06F 3/01* | (2006.01) |
| *G06F 3/16* | (2006.01) |
| *G06F 3/03* | (2006.01) |
| *G06F 3/0484* | (2013.01) |

(52) U.S. Cl.
CPC ............. *G06T 19/20* (2013.01); *G06F 1/163* (2013.01); *G06F 3/011* (2013.01); *G06F 3/016* (2013.01); *G06F 3/0304* (2013.01); *G06F 3/167* (2013.01); *G06T 19/006* (2013.01); *G06F 3/017* (2013.01); *G06F 3/04842* (2013.01); *G06F 3/04845* (2013.01); *G06T 2219/2012* (2013.01); *G06T 2219/2024* (2013.01)

(58) Field of Classification Search
CPC .................. G06T 19/006; G06T 19/20; G06T 2219/2012; G06T 2219/2204; G06F 3/017; G06F 3/04842; G06F 3/04845
See application file for complete search history.

(56) References Cited

U.S. PATENT DOCUMENTS

| | | | | |
|---|---|---|---|---|
| 2011/0169726 A1* | 7/2011 | Holmdahl | .......... | G06K 9/00342 345/156 |
| 2012/0306853 A1* | 12/2012 | Wright | .................... | G06T 19/20 345/419 |

(Continued)

*Primary Examiner* — Michael Le
(74) *Attorney, Agent, or Firm* — Hanley, Flight & Zimmerman, LLC

(57) ABSTRACT

Technologies for virtual attribute assignment include a compute device. The compute device is configured to receive an attribute assignment command from a user and analyze the attribute assignment command to determine a user-selected virtual object, a user-referenced attribute of the user-selected virtual object, a user-selected real object, and a user-referenced attribute of the user-selected real object. Based on the attribute assignment command, the compute device is further configured to determine a state of the user-referenced attribute of the user-selected real object and update a state of the user-referenced attribute of the user-selected virtual object based on the state of the user-referenced attribute of the user-selected real object.

25 Claims, 9 Drawing Sheets

(56) References Cited

U.S. PATENT DOCUMENTS

| | | | |
|---|---|---|---|
| 2013/0286004 A1* | 10/2013 | McCulloch | G06T 19/006 345/419 |
| 2014/0028712 A1* | 1/2014 | Keating | G06T 7/246 345/633 |
| 2015/0091780 A1* | 4/2015 | Lyren | G06F 3/012 345/8 |
| 2015/0131913 A1* | 5/2015 | Anderson | G06F 3/017 382/203 |
| 2015/0187108 A1* | 7/2015 | Mullins | G06T 11/60 345/633 |
| 2016/0225164 A1* | 8/2016 | Tomlin | G06T 19/006 |
| 2017/0131964 A1* | 5/2017 | Baek | G06T 19/006 |

\* cited by examiner

TECHNOLOGIES FOR VIRTUAL ATTRIBUTE ASSIGNMENT REFERENCING REAL OBJECTS

BACKGROUND

Augmented Reality (AR) technology includes techniques for displaying virtual objects or images on real space or on a display of an image of that real space. In some augmented reality systems, the virtual objects may include various attributes that may be selected or modified by a user. For example, in the case of a virtual character, the character's hair or skin tone may be selectable by the user to produce a user-customized virtual character.

Depending on the complexity of the augmented reality system, varying levels of user interaction with the virtual objects may be supported. For example, in some systems, the virtual objects may exhibit scripted interactions or functions, such as moving about the real space and interacting with the user and/or other virtual objects.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
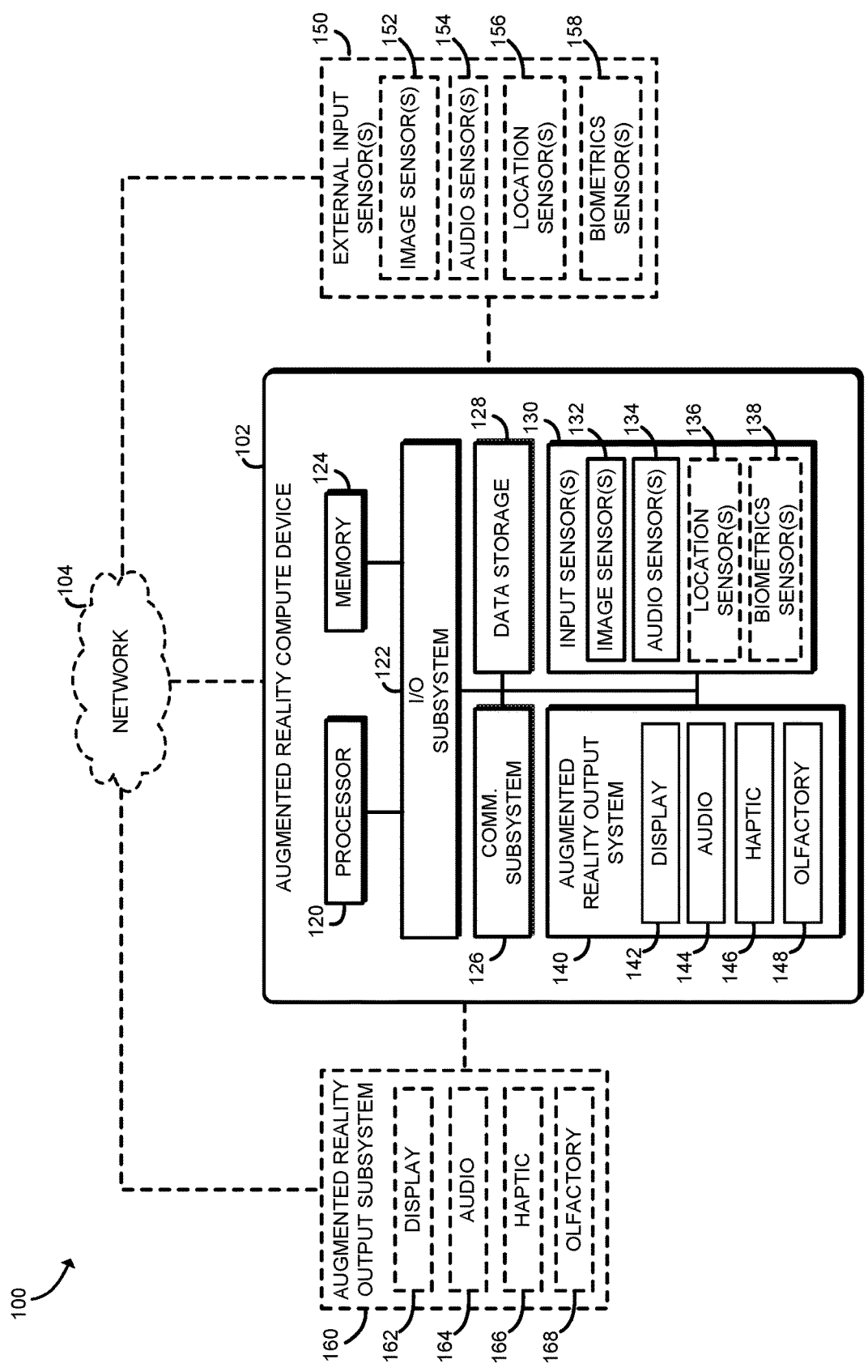
FIG. 1 is a simplified block diagram of at least one embodiment of a system for virtual attribute assignment of virtual object(s)

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, an augmented reality system 100 for virtual attribute assignment includes an augmented reality compute device 102 to enable a creation or a modification of attributes associated with a virtual object in an augmented reality space by referencing attributes of a real object in a real physical environment. To do so, a user may issue an attribute assignment command through any modality (e.g., voice, air gesture, and touch gesture) to assign one or more attributes to a virtual object generated by the augmented reality compute device 102 by referencing one or more attributes associated with a corresponding real object. For example, the user may select or identify a virtual object whose attribute is to be modified, an attribute of the virtual object to be modified, a real object whose attribute is to be copied, and an attribute of the selected real object that is to be copied. The attributes may be embodied as any type of attribute or characteristic of the virtual and/or real object including, for example, a name, a color, a pattern, a texture, an emitted sound, a location, a behavior, an ability, an association, a relationship to another virtual object or person that may be associated with or assigned to a virtual object, and/or other characteristic, quality, context, or feature.

For example, in one illustrative implementation, the user may hold a stuffed bear and issue an attribute assignment command, "I want a virtual bear named Oscar that looks like this and has wings like a butterfly." In response, the augmented reality compute device 102 is configured to analyze the user's attribute assignment command to determine what "this" is by, for example analyzing a gesture of the user. In response to determining that the user is holding an object, the augmented reality compute device 102 may identify the object by using an image recognition technique. Moreover, the augmented reality compute device 102 may determine attributes of the wings of a butterfly by searching an online database. Subsequently, the augmented reality compute device 102 may create a virtual bear with the butterfly wings and assign the name Oscar. In this way, the user is able to assign attributes of the virtual object (i.e., the virtual bear) based on user-identified/selected attributes of a real object (e.g., the stuffed bear).

As a further example, while virtual Oscar is rendered in the real environment, the user may point to a stuffed frog on the user's dresser and issue a command, "I want Oscar to be green, like that stuffed frog on my dresser." In response, the augmented reality compute device 102 is configured to analyze the attribute assignment command to determine that "Oscar" is the virtual bear and identify Oscar as the virtual object whose attribute is to be modified. The augmented reality compute device 102 may further analyze the attribute assignment command to determine what is referenced by the phase "that stuffed frog" by analyzing the user's gesture. In this example, the stuffed frog is the real object whose attribute is to be copied, and the augmented reality compute device 102 may determine that the color of the stuffed frog is green. As such, the "color" is the attribute of the real object, and "green" is the state (or "value") of the attribute to be copied. The augmented reality compute device 102 then updates the state of the selected attribute of the virtual bear Oscar to render Oscar the color green. In this way, the user can create, modify, and/or update attributes of a virtual object by referencing one or more features of a real object.

Although described below as an "augmented reality" compute device, it should be appreciated that the compute device 102 may render virtual reality media content instead of, or in addition to, augmented reality media content. Due to the similarity between augmented reality rendering and virtual reality rendering, reference to augmented reality in the following description is equally applicable to virtual reality and should not be interpreted as necessarily limited to only augmented reality rendering and systems.

Referring back to FIG. 1, the augmented reality compute device 102 may be embodied as any type of computer or computing system capable of rendering virtual objects in the real physical environment and performing the functions described herein. For example, in the illustrative embodiment, the augmented reality compute device 102 is embodied as a projected augmented reality display, a head-worn augmented reality display, or an augmented reality display screen. In other embodiments, the augmented reality compute device 102 may be embodied as a system with various remote components. For example, the augmented reality compute device 102 may be configured to interact with one or more external input sensors 150 and/or an augmented reality output subsystem 160 via a network 104.

As illustratively shown in FIG. 1, the augmented reality compute device 102 includes a processor 120, an input/output ("I/O") subsystem 122, a memory 124, a communication subsystem 126, a data storage 128, one or more input sensors 130, and an augmented reality output system 140. It should be appreciated that the augmented reality compute device 102 may include other or additional components, such as those commonly found in a augmented reality computing computer (e.g., various input/output devices and/or other components), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the augmented reality compute device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the augmented reality compute device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the augmented reality compute device 102, on a single integrated circuit chip.

The communication subsystem 126 may be embodied as any type of communication circuit, device, or collection thereof, capable of enabling communications between the augmented reality compute device 102 and the external input sensor devices 150 and/or the augmented reality output subsystem 160. To do so, the communication subsystem 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The data storage 128 may be embodied as any type of device or devices configured for short-term or long-term storage of data such as, for example, memory devices and circuits, memory cards, hard disk drives, solid-state drives, or other data storage devices. In the illustrative embodiment, the data storage 128 may store attribute(s) associated with the virtual object(s) and attributes associated with the real object(s).

The input sensors 130 may be embodied as any type of sensor capable of receiving a user input or command, generating real object attribute data 212 (see FIG. 2) indicative of attributes (e.g., color, sound, texture, location, etc.) of real objects in a real physical environment, and/or generating context or other data related to the user (e.g., motion, emotion, location, biometrics, etc.). In the illustrative embodiment, the input sensors 130 may include one or more image sensors 132, one or more audio sensors 134, one or more location sensors 136, and/or one or more biometrics sensors 138, in some embodiments. It should be appreciated that, in the illustrative embodiment, one or more input devices may be coupled to the augmented reality compute device 102 (e.g, augmented reality glasses 102).

The image sensor(s) 134 may be embodied as any type of sensor capable of capturing an image of one or more real objects in the real physical environment (e.g., a physical environment where an augmented reality is being rendered). Specifically, the image sensor(s) 134 may generate sensor data indicative of a motion of one or more real objects in the real environment and/or a motion or a gesture of the user. For example, the image sensor 132 may be embodied as a camera or a video camera. In such embodiments, the camera may be two-dimensional or three-dimensional. The audio sensor(s) 136 may be embodied as any type of sensor capable of generating or producing sensor data indicative of a voice of the user or background noise surrounding the user. For example, the audio sensor 136 may be embodied as a microphone or other audio capturing device. The location sensor(s) 136 may be embodied as any type of sensor capable of determining a location of one or more real objects or the user in the real environment. For example, the augmented reality compute device 102 may determine the vicinity, proximity, or relative spatial relationship between multiple real objects or the real object(s) and the user.

In embodiments in which the augmented reality compute device 102 is embodied as a wearable augmented reality device, such as augmented reality glasses, the input sensors 130 may include one or more biometrics sensors 138 that generate data indicative of user's biometric measurements, such as heartrate, breathing, and body temperature, which may be used to determine a context of the user (e.g., an activity, an emotion). In some embodiments, the biometrics sensors 138 may include a motion sensor to detect movement of the user.

It should be appreciated that, in some embodiments, the augmented reality system 100 may include, in addition to or in place of the input sensors 130, one or more external input sensors 150. In such embodiments, the augmented reality compute device 102 may communicate with one or more external input sensors 150 to receive attribute(s) associated with one or more real objects in the real environment as discussed above. Similar to the input sensors 130, the external input sensors 150 may include one or more image sensors 152, one or more audio sensors 154, one or more location sensors 156, and one or more biometrics sensors 158. For example, the biometric sensors 158 may be a smart watch or an exercise tracker.

The augmented reality output system 140 may include any type of devices and components for rendering virtual objects in the real physical environment. In the illustrative environment, the augmented reality output system 140 includes a display output device 142, an audio output device 144, a haptic output device 146, and an olfactory output device 148. The display output device 142 may be embodied as any type of device (e.g., augmented reality glasses, a projector, or an augmented reality display screen) capable of rendering one or more virtual objects to the user. The audio output device 144 may be embodied as any type of device (e.g., a speaker) capable of rendering one or more virtual objects that include, or are otherwise embodied as, a sound. Similarly, the haptic output device 146 may be embodied as any type of output device capable of rendering a virtual object that includes, or is otherwise embodied as, haptic or tactile feedback. For example, the haptic output device 146 may be embodied as a rumble device.

Via the various output devices, the augmented reality output system 140 may render one or more virtual objects to the user that affects multiple senses of the user (e.g., visual, audible, touch, etc.). As such, it should be appreciated that the rendered virtual objects may include visual, audio, tactile, and/or other sensory output. For example, a virtual stuffed bear may be rendered as a brown and furry bear making a humming sound on the display output device 142. Additionally, the olfactory output device 148 may be embodied as any type of device capable of generating different kinds of odors. It should be appreciated that having multiple output modalities to generate a virtual object allows the user to assign various different attribute modalities to a virtual object.

In some embodiments, the augmented reality compute device 102 may also include one or more peripheral devices (not shown). The peripheral devices may include any number of additional peripheral or interface devices, such as other input/output devices, storage devices, and so forth. The particular devices included in the peripheral devices may depend on, for example, the type and/or configuration of the augmented reality compute device 102.

Additionally, in some embodiments, the augmented reality system 100 may further include, in addition to or in place of the augmented reality output system 140, an external augmented reality output subsystem 160 that is in communication with the augmented reality compute device 102 to render the virtual object(s) generated by the augmented reality compute device 102. Similar to the augmented reality output system 140, the augmented reality output subsystem 160 may include a display output device 162, an audio output device 164, a haptic output device 166, and/or an olfactory output device 168 to output virtual objects and attributes associated with the virtual objects in the real physical environment. It should be appreciated that, in some embodiments, the augmented reality output subsystem 160 and the external input sensors 150 may be incorporated in the same device.

The network 104 may be embodied as any type of network capable of facilitating communications between the augmented reality compute device 102 and the augmented reality output subsystem 160 and/or one or more external input sensors 150. For example, the network 104 may be embodied as, or otherwise include, a wireless local area network (LAN), a wireless wide area network (WAN), a cellular network, and/or a publicly-accessible, global network such as the Internet. As such, the network 104 may include any number of additional devices, such as additional computers, routers, and switches, to facilitate communications thereacross.

Figure 2:
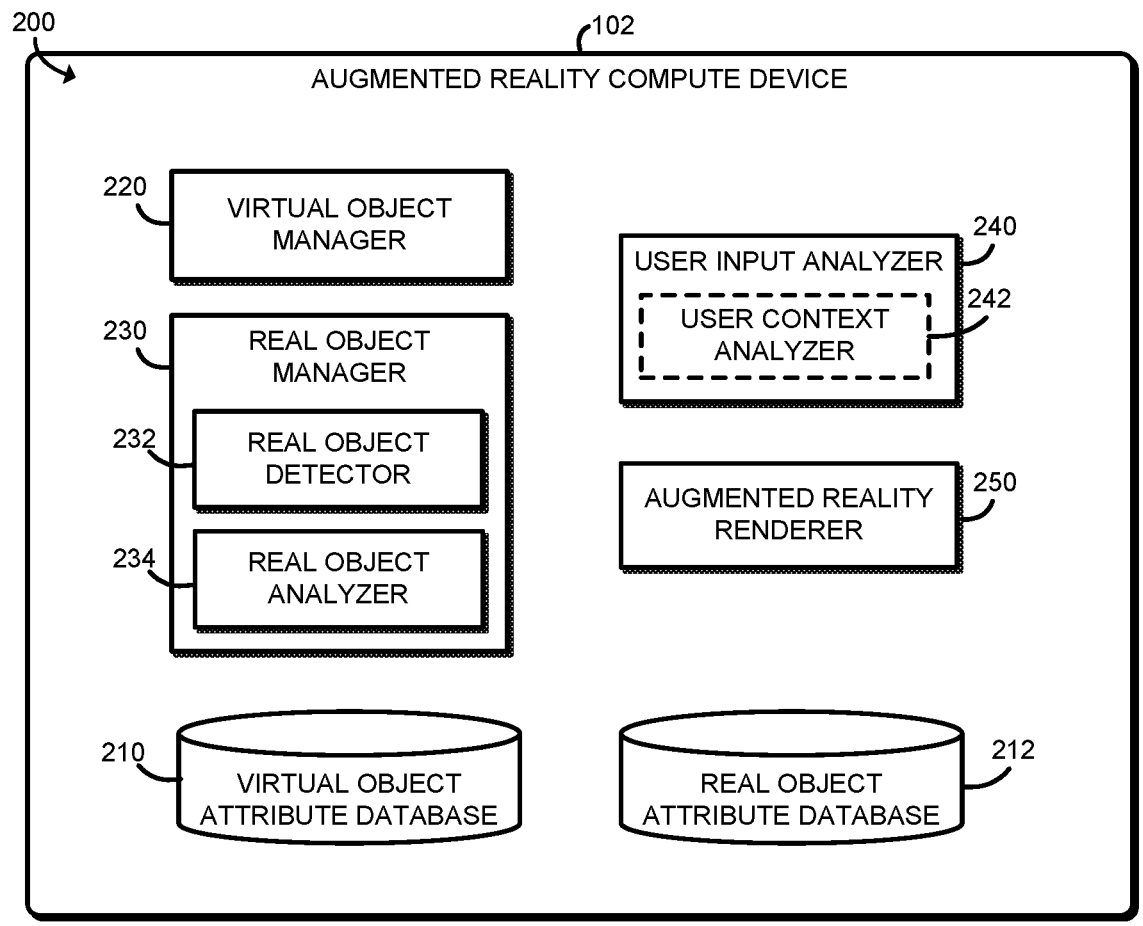
FIG. 2 is a simplified block diagram of at least one embodiment of an environment that may be established by an augmented reality compute device of the system of FIG. 1.
Figure 3:
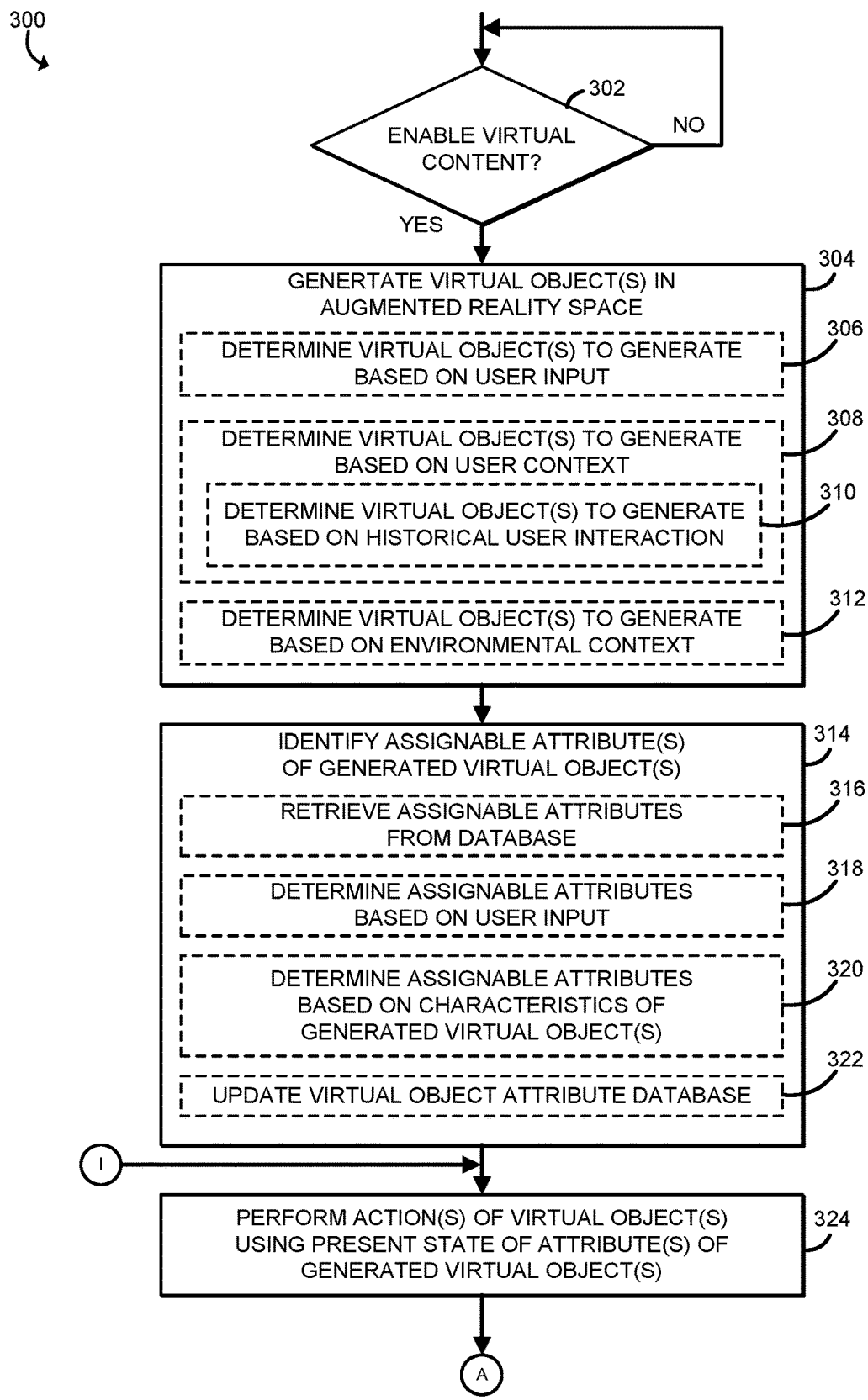
FIGS. 3-9 is a simplified flow diagram of at least one embodiment of a method for assigning one or more attributes to a virtual object by referencing a real object in a real physical environment that may be executed by the augmented reality compute device of FIGS. 1 and 2.

Referring now to FIG. 2, in the illustrative embodiments, the augmented reality compute device 102 may establish an environment 200 during operation. The illustrative environment 200 includes a virtual object attribute database 210 and a real object attribute database 212 that may be stored in the data storage 128 of the augmented reality compute device 102. The virtual object attribute database 210 may be embodied as any data indicative of one or more attributes and a state of each attribute associated with each of the virtual objects. It should be appreciated that the attribute(s) may be predefined or user-referenced. In some embodiments, the virtual object attribute database 210 may further include one or more limitations assigned to a virtual object (s) in a real physical environment. For example, the virtual object attribute database 210 may define a limited number of states available for a particular attribute of a corresponding virtual object. The real object attribute database 212 may be embodied as any data indicative of one or more attributes and a state of each attribute associated each of real objects.

The illustrative environment 200 further includes a virtual object manager 220, a real object manager 230, a user input analyzer 240, and an augmented reality renderer 250. The real object manager 230 further includes a real object detector 232 and a real object analyzer 234. The user input analyzer 240 may include a user context analyzer 242. The various components of the environment 200 may be embodied as hardware, firmware, software, or a combination thereof. As such, in some embodiments, one or more of the components of the environment 200 may be embodied as circuitry or collection of electrical devices (e.g., a virtual object manager circuit 220, a real object manager circuit 230, a real object detector circuit 232, a real object analyzer circuit 234, a user input analyzer circuit 240, a user context analyzer 242, an augmented reality renderer circuit 250, etc.). It should be appreciated that, in such embodiments, one or more of the virtual object manager circuit 220, the real object manager circuit 230, the real object detector circuit 232, the real object analyzer circuit 234, the user input analyzer circuit 240, the user context analyzer 242, the augmented reality renderer circuit 250, and/or other components of the augmented reality compute device 102. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the processor 120 or other components of the augmented reality compute device 102.

The virtual object manager 220, which may be embodied as hardware, firmware, software, virtualized hardware, emulated architecture, and/or a combination thereof as discussed above, is configured to generate one or more virtual objects to be rendered in a physical real environment. In some embodiments, the virtual object manager 220 may be configured to determine which virtual object(s) to generate based on a user input, a user context, a historical user interaction, and/or an environmental context. To do so, for example, the virtual object manager 220 may further be configured to determine a user input pattern to identify which virtual object(s) the user has normally interacted with or requested to generate at a particular time and day and/or identify the time, day, temperature, and/or background music in the environment to determine an appropriate virtual object(s) to generate.

Moreover, the virtual object manager 220 may be configured to identify one or more assignable attributes of the generated virtual object(s) and assign or update attribute(s) in response to receiving an attribute assignment command from the user. In some embodiments, the virtual object manager 220 may be further configured to retrieve one or more assignable attributes based on a user input and/or from the virtual object attribute database 210. As described above, the virtual object attribute database 210 may include predefined attributes associated with the virtual objects. Additionally, in some embodiments, the virtual object manager 220 may be configured to determine or infer one or more assignable attributes based on characteristics of the generated virtual object(s). For example, if the generated virtual object is a virtual stuffed bear, the virtual object manager 220 may determine that the assignable attributes associated with general characteristics of the stuffed bear include size, texture, sound, movement, and/or colors of their eyes, nose, and fur based on pervious virtual stuffed bears and/or by inferring those attributes based on attributes of other stuffed animals or toys. In some embodiments, virtual object manager 220 may be configured to update the virtual object attribute database 210 in response to determining that one or more new assignable attributes of the generated virtual object(s) are identified.

The real object manager 230, which may be embodied as hardware, firmware, software, virtualized hardware, emulated architecture, and/or a combination thereof as discussed above, is configured to detect one or more real objects in the real environment and determine one or more attributes associated with the real objects. To do so, as discussed above, the real object manager 230 includes the real object detector 232 and the real object analyzer 234. It should be appreciated that the real object manager 230 is further configured to update the real object attribute database 212 in response to determining one or more new real objects or new attributes of the real object(s).

The real object detector 232 is configured to detect the presence of one or more real objects in the real environment by analyze data from the input sensor(s) 130 (e.g., the image sensor(s) 132, the audio sensor(s) 134, and the location sensor(s) 136). For example, as part of an initialization procedure or in response to a user's selection, the real object detector 232 may determine the real objects that are in vicinity of the user based on the data received from the image sensor(s) 132. In some embodiments, the real object detector 232 may determine the real objects that are in vicinity of a virtual object that is presently being rendered in the real environment. Additionally, the real object detector 232 may analyze the data from the input sensor(s) 130 using image processing to identify the detected real objects.

The real object analyzer 234 is configured to determine one or more attributes and a state of each attribute associated with the detected real object(s) detected by the real object detector 232. To do so, the real object analyzer 234 may utilize any suitable methodology and/or technology. For example, in some embodiments, the real object analyzer 234 may be configured to determine one or more attributes and a state of a corresponding attribute based on a user input and/or data received from a corresponding real object. For example, the real object may be a smart object. The smart object may communicate with the real object analyzer 234 to send its associated attributes and corresponding state.

Additionally or alternatively, the real object analyzer 234 may determine one or more attributes and a state of a corresponding attribute by using object recognition processing and/or based on a user interaction history. The user interaction history may be based on previous user inputs. For example, if the real object analyzer 234 has previously identified an object on the user's dresser as a green stuffed frog in response to a user input or an attribute assignment command, the real object analyzer 234 may determine that the color of the stuffed frog is green if the real object analyzer 234 recognizes that stuffed frog again. In the illustrative embodiment, the user interaction history may be stored in the real object attribute database 212. It should be appreciated that the real object analyzer 234 may be configured to learn or interpret one or more attributes and a state of a corresponding attribute over time using, for example, machine learning techniques. For example, if the real object analyzer 234 determines that the user calls "fluffy" to an object (e.g., a stuffed cat), the augmented reality compute device 102 may learn that the name of that object is "fluffy."

The user input analyzer 240, which may be embodied as hardware, firmware, software, virtualized hardware, emulated architecture, and/or a combination thereof as discussed above, is configured to analyze an attribute assignment command received by the user. The attribute assignment command may be provided through any modality (e.g., voice, air gesture, and touch gesture) to assign one or more attributes to a virtual object by referencing, explicitly or implicitly, one or more attributes associated with a real object. The user input analyzer 240 is configured to analyze the attribute assignment command from the user to determine a virtual object whose attribute is to be modified, an attribute of the virtual object to be modified, a selected real object whose attribute is to be copied, and/or an attribute of the selected real object that is to be copied. The attribute assignment command of the user may further include one or more limitations of an attribute assigned to a virtual object.

For example, the user may indicate that the virtual bear Oscar cannot jump high enough to jump on that dresser.

In some embodiments, the user input analyzer 240 may include the user context analyzer 242 to determine current situations in the real physical environment, such as locations of people, social interactions between people, current activity, and access of people to display. It should be appreciated that various virtual objects may be triggered for acting with corresponding attributes based on the user context.

The augmented reality renderer 250, which may be embodied as hardware, firmware, software, virtualized hardware, emulated architecture, and/or a combination thereof as discussed above, is configured to render the virtual object(s) in the real environment using one or more output devices of the augmented reality output system 140.

Referring now to FIGS. 3-9, in use, the augmented reality compute device 102 may execute a method 300 for assigning or updating a state of a user-referenced attribute associated with a user-selected virtual object based on a state of a user-referenced attribute associated with a user-selected real object. The method 300 begins with block 302 in which the augmented reality compute device 102 determines whether to enable virtual content. If not, the method 300 loops back to block 302 to continue to monitor for a request to enable the virtual content. If the augmented reality compute device 102 determines to render the augmented reality virtual content, the method 300 advances to block 304 in which the augmented reality compute device 102 generates one or more virtual objects in an augmented reality space to be rendered in a physical real environment. To do so, the augmented reality compute device 102 may determine one or more virtual objects to generate based on a user input as indicated in block 306. For example, as discussed above, a user may issue a command to the augmented reality compute device 102 to generate a stuffed bear.

Additionally or alternatively, in block 308, the augmented reality compute device 102 may determine one or more virtual objects to generate based on a user context. The user context may include user's activities and/or user's emotion. For example, in some embodiments, the augmented reality compute device 102 may determine one or more virtual objects to generate based on a historical user interaction as indicated in block 310. In such embodiments, the augmented reality compute device 102 may determine a user's activity or input pattern to identify which virtual object(s) the user has normally interacted with or requested to generate at this time and a day or when the user is performing the present activity of the user. For example, if the user requests to generate stars on a ceiling of a user's bedroom at 10 PM every night, the augmented reality compute device 102 may generate the stars to be rendered on the ceiling of the user's bedroom at 10 PM without receiving a user input or with minimal user instruction.

Additionally or alternatively, in block 312, the augmented reality compute device 102 may determine one or more virtual objects to generate based on an environmental context. For example, the augmented reality compute device 102 may determine time, day, temperature, and/or background music that is being played in the environment to determine an appropriate virtual object(s) to generate. By determining the environmental context, the augmented reality compute device 102 may be able to determine, for example, a context or pattern of the user's activities.

Subsequent to generating one or more virtual objects, the augmented reality compute device 102 identifies one or more assignable attributes of the generated virtual object(s) as indicated in block 314. To do so, in some embodiments, the augmented reality virtual object 102 may retrieve one or more assignable attributes from the virtual object attribute database 210 as indicated in block 316. As described above, the virtual object attribute database 210 may store predefined attributes associated with the virtual objects. For example, each virtual object and its associated attributes may be stored in a database, spreadsheet, or other data format accessible by the augmented reality compute device 102.

Additionally or alternatively, in block 318, the augmented reality compute device 102 may determine one or more assignable attributes based on a user input. In other words, the user may set or define the attributes of a particular virtual object that can be assigned or modified. For example, user may indicate that the fur color and texture of a virtual stuffed bear are attributes that may be modified.

Additionally or alternatively, in block 320, the augmented reality compute device 102 may determine one or more assignable attributes based on characteristics of the generated virtual object(s). For example, if the generated virtual object is a virtual stuffed bear, the assignable attributes associated with general characteristics of the stuffed bear may include size, texture, sound, movement, and/or colors of their eyes, nose, and fur. As such, the augmented reality compute device 102 may analyze the virtual object to infer or assign which attributes may be modified (e.g., based on the similarity of the virtual objects to other virtual objects or a class of virtual objects, such as "toys"). Regardless, in block 322, the augmented reality compute device 102 may update the virtual object attribute database 210 in response to determining that one or more new assignable attributes of the generated virtual object(s) are identified.

In block 324, the augmented reality compute device 102 performs one or more actions of the generated virtual object(s) using a present state of attribute(s) associated with the generated virtual object(s). For example, depending on the particular virtual object rendered, the functions of the virtual object may include walking around and/or interacting with other virtual objects and/or real objects. Such actions (e.g., walking) may be dependent upon the present state of one or more attributes (e.g., present gait motion assigned to the virtual object). The present state of attribute(s) may be a general or predefined state of attribute(s) associated with the virtual object(s). For example, the virtual stuffed bear may be rendered as having brown fur, brown eyes, and a black nose as an initial state.

Figure 4:
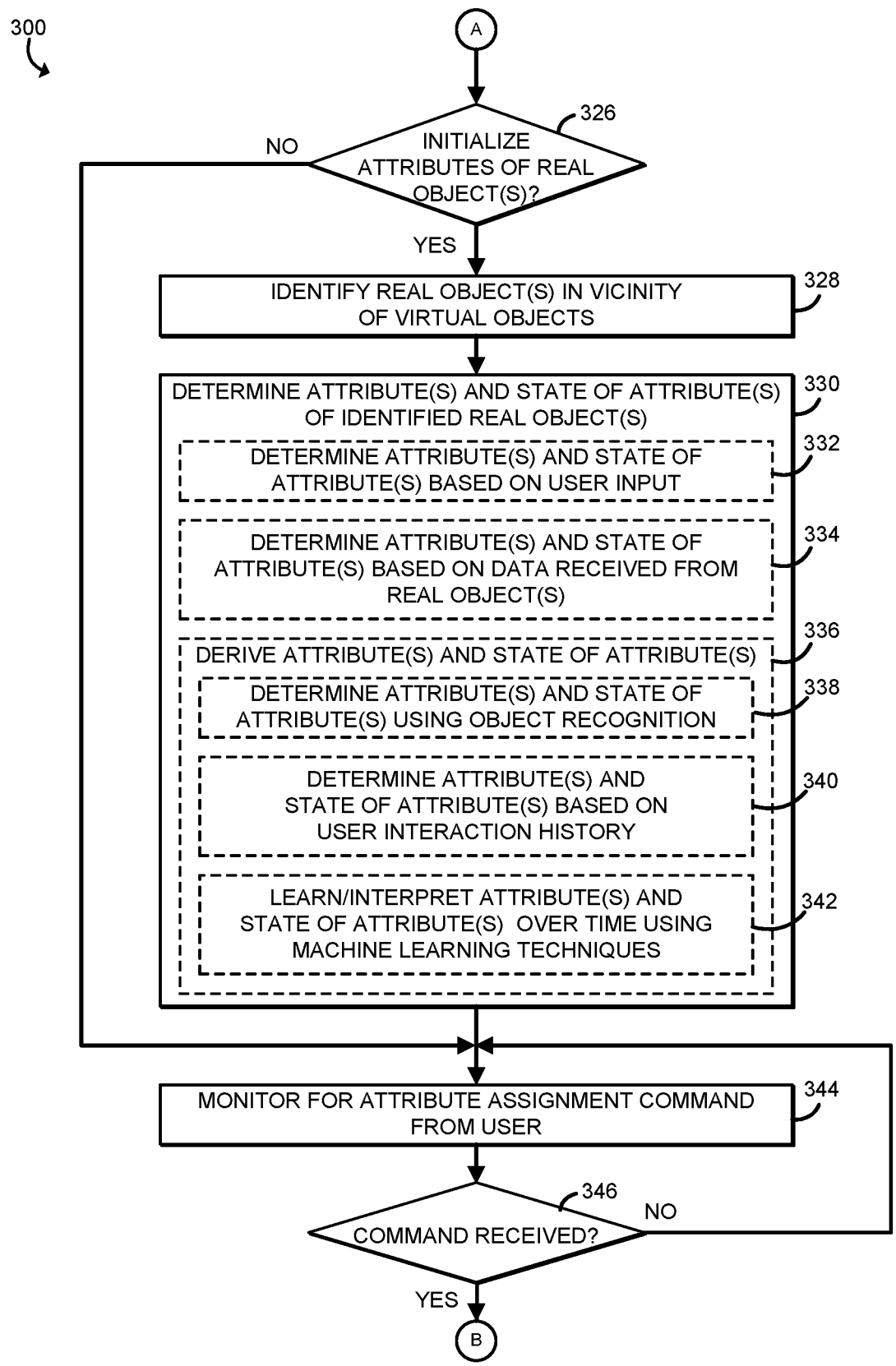
Figure 5:
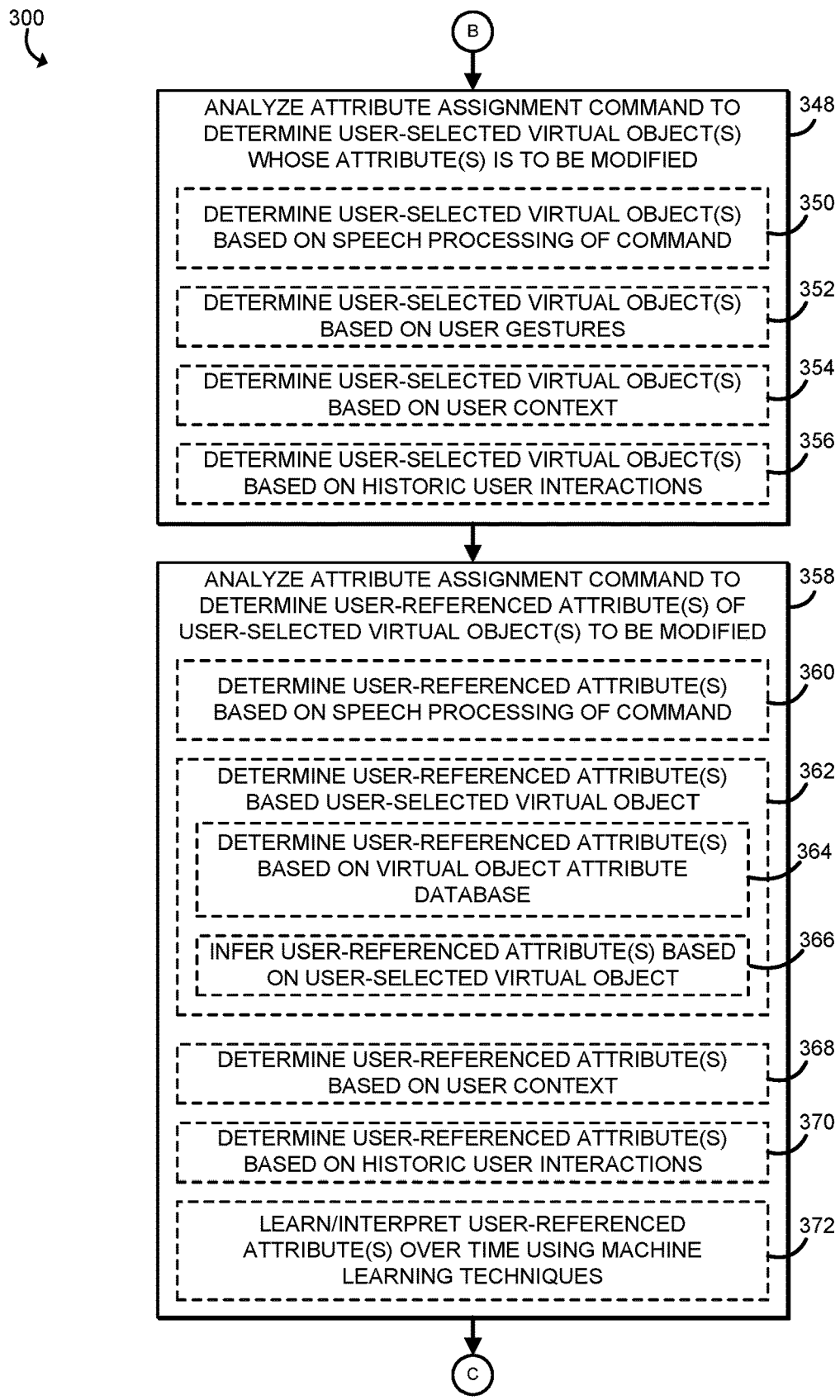

Subsequently in block 326 of FIG. 4, the augmented reality compute device 102 determines whether to initialize attributes of one or more real objects. That is, the augmented reality compute device 102 determines whether to initially determine which attributes, and perhaps their present state, a user may select from a corresponding real object. If not, the method 300 skips ahead to block 344 in which the augmented reality compute device 102 monitors for an attribute assignment command from the user. If, however, the augmented reality compute device 102 determines to initialize attributes of real object(s), the method 300 advances to block 328.

In block 328, the augmented reality compute device 102 identifies one or more real objects in vicinity of the virtual object(s). To do so, the augmented reality compute device 102 may analyze data received from the one or more input sensors 130 (e.g., the image sensor(s) 132, the audio sensor(s) 134, and the location sensor(s) 136) to determine which real objects are present in the local real environment. For example, the augmented reality compute device 102 may analyze image data from the image sensor 132 to identify real objects in the local vicinity of the user.

In block 330, the augmented reality compute device 102 determines one or more attributes and a state of each corresponding attribute of the real object(s) identified in block 328. To do so, in some embodiments, the augmented reality compute device 102 may determine one or more attributes and a state of each attribute based on a user input as indicated in block 332. For example, the user may point to a real object and indicate that the real object is a stuffed frog named Oscar and is green. The attributes in this example are the name and the color of the stuffed frog. Additionally, the state or value associated with the name attribute is Oscar, and the state associated with the color attribute is green.

In some embodiments, the augmented reality compute device 102 may determine one or more attributes and a state of each attribute based on data received from a corresponding real object as indicated in block 334. For example, a real object may be embodied as a smart object and may communicate with the augmented reality compute device 102 to send its associated attributes and corresponding states. For example, the stuffed frog may be a smart object that can communicate its name, color, texture, and/or any other characteristics associated with the stuffed frog to the augmented reality compute device 102.

In some embodiments, the augmented reality compute device 102 may derive one or more attributes and a state of a corresponding attribute as indicated in block 336. To do so, in block 338, the augmented reality compute device 102 may determine one or more attributes and a state of each attribute using object recognition processing. Additionally or alternatively, in block 340, the augmented reality compute device 102 may determine one or more attributes and a state of a corresponding attribute based on a user interaction history. The user interaction history may be based on previous user inputs. For example, if the augmented reality compute device 102 has previously identified an object on the user's dresser as a green stuffed frog in response to a user input or an attribute assignment command, the augmented reality compute device 102 may determine that the color of the stuffed frog is green if the augmented reality compute device 102 recognizes that stuffed frog again. In the illustrative embodiment, the user interaction history may be stored in the real object attribute database 212 and/or the virtual object attribute database 210.

Additionally or alternatively, in block 342, the augmented reality compute device 102 may learn or interpret one or more attributes and a state of a corresponding attribute over time using machine learning techniques. For example, if the augmented reality compute device 102 determines that the user says "fluffy" to an object (e.g., a stuffed cat), the augmented reality compute device 102 may learn that the name of that object is "fluffy."

After the augmented reality compute device 102 initializes the attributes of any local real objects or if the initialization procedure is skipped, the augmented reality compute device 102 monitors for an attribute assignment command from the user in block 344. If the augmented reality compute device 102 determines that an attribute assignment command has not been received in block 346, the method 300 loops back to block 344 to continue monitoring for an attribute assignment command form the user. If, however, the augmented reality compute device 102 determines that the attribute assignment command was received, the method 300 advances to block 348 of FIG. 5. As discussed above, in the illustrative embodiment, the attribute assignment command may include (i) one or more user-selected virtual objects whose attribute(s) is to be modified, (ii) one or more user-referenced attributes of the user-selected virtual object(s) to be modified, (iii) one or more user-selected real objects whose attribute(s) is to be copied, and/or (iv) one or more user-referenced attributes of the user-selected real object(s). It should be appreciated that those features of the attribute assignment command may be implicit and inferred or determined by the augmented reality compute device 102 (e.g., based on a user gesture).

In block 348, the augmented reality compute device 102 analyzes the attribute assignment command to determine one or more user-selected virtual objects whose attribute(s) is to be modified. To do so, in some embodiments, the augmented reality compute device 102 may determine the one or more user-selected virtual objects based on speech processing of the attribute assignment command as indicated in block 350. For example, the user may call out which virtual object the user is selecting. Additionally or alternatively, in block 352, the augmented reality compute device 102 may determine one or more user-selected virtual objects based on user gestures. For example, the user may point to a virtual object that is being rendered in the real environment. Additionally or alternatively, in block 354, the augmented reality compute device 102 may determine one or more user-selected virtual objects based a user context. For example, the augmented reality compute device 102 may determine the user-selected virtual object(s) based on the user's present activity or location. Additionally or alternatively, in block 356, the augmented reality compute device 102 may determine one or more user-selected virtual objects based on historic user interactions (e.g., which virtual objects the user has historically selected at the present time and day).

Subsequently, in block 358, the augmented reality compute device 102 further analyzes the attribute assignment command to determine one or more user-referenced attributes of the user-selected virtual object(s) to be modified. To do so, in some embodiments, the augmented reality compute device 102 may determine one or more user-referenced attributes based on speech processing of the attribute assignment command as indicated in block 360. For example, the user may state that "I want my virtual bear Oscar to be green." In that example, the augmented reality compute device 102 may infer the user is referencing the color of the virtual bear.

Additionally or alternatively, in block 362, the augmented reality compute device 102 may determine one or more user-referenced attributes based on the user-selected virtual object. For example, some virtual objects may have only one assignable attribute. In some embodiments, the augmented reality compute device 102 may determine one or more user-referenced attributes based on the virtual object attribute database 210 as indicated in block 364. That is, as discussed above, the virtual object attribute database 210 may identify assignable attributes for each virtual object. In other embodiments, the augmented reality compute device 102 may infer one or more user-referenced attributes based on the user-selected virtual object as indicated in block 366. For example, the user may point to the stuffed frog on the user's dresser and issue a command, "I want my virtual bear Oscar to look like this frog." Because the user did not specify which attributes (e.g., color, shape, or texture) of Oscar to modify, the augmented reality compute device 102 may infer which attributes are referenced based on the command language (e.g., by inferring "to look like" is referencing a color and texture attribute of the virtual bear).

Additionally or alternatively, in block 368, the augmented reality compute device 102 may determine one or more user-referenced attributes based the user context. For example, similar to the user-selected virtual object, the augmented reality compute device 102 may determine a user-referenced attribute based on the present activity of the user. Additionally or alternatively, in block 370, the augmented reality compute device 102 may determine one or more user-referenced attributes based on historic user interactions. For example, if the augmented reality compute device 102 determined that the user referenced the color and texture of the stuffed frog on the user's dresser in the previous example (in response to the user's command, "I want my virtual bear Oscar to look like this frog"), the augmented reality compute device 102 may infer which attributes of the stuffed frog are referenced next time the user wants the virtual bear Oscar to look to the same frog on the user's dresser. Additionally or alternatively, in block 372, the augmented reality compute device 102 may learn or interpret one or more user-referenced attributes over time using machine learning techniques to improve inference of one or more attributes of the virtual object(s).

Figure 6:
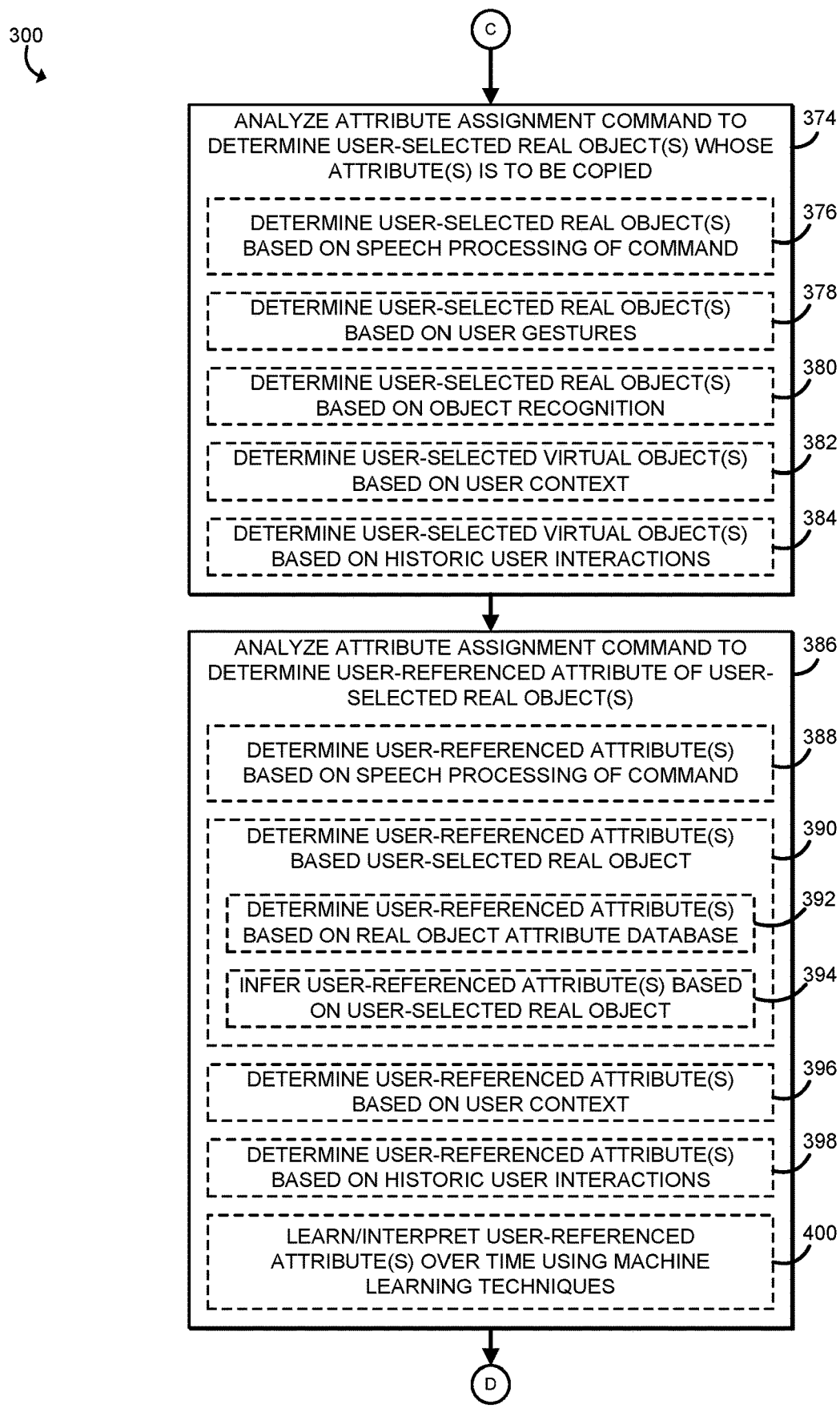

In block 374 of FIG. 6, the augmented reality compute device 102 further analyzes the attribute assignment command to determine one or more user-selected real objects whose attribute(s) is to be copied. To do so, the augmented reality compute device 102 may perform one or more functions described in previous blocks 350-356 for user-selected real object(s) instead of the user-selected virtual object(s). For example, in some embodiments, the augmented reality compute device 102 may determine one or more user-selected real objects based on speech processing of the attribute assignment command as indicated in block 376. Additionally or alternatively, in block 378, the augmented reality compute device 102 may determine one or more user-selected real objects based on user gestures. For example, the augmented reality compute device 102 may determine that the user is pointing by image processing of the sensor data received from the image sensor(s). Additionally or alternatively, in block 380, the augmented reality compute device 102 may determine one or more user-selected real objects based on the object recognition processing. Additionally or alternatively, in block 382, the augmented reality compute device 102 may determine one or more user-selected real objects based a user context. Additionally or alternatively, in block 384, the augmented reality compute device 102 may determine one or more user-selected real objects based on historic user interactions.

Subsequently, in block 386, the augmented reality compute device 102 further analyzes the attribute assignment command to determine one or more user-referenced attributes of the user-selected real object(s). To do so, the augmented reality compute device 102 may perform one or more functions described in previous blocks 360-372. For example, in some embodiments, the augmented reality compute device 102 may determine one or more user-referenced attributes based on speech processing of the attribute assignment command as indicated in block 388. Additionally or alternatively, in block 390, the augmented reality compute device 102 may determine one or more user-referenced attributes based on the user-selected real object. In some embodiments, the augmented reality compute device 102 may determine one or more user-referenced attributes based on the real object attribute database 212 as indicated in block 392. In other embodiments, the augmented reality compute device 102 may infer one or more user-referenced attributes based on the user-selected real object as indicated in block 394. Additionally or alternatively, in block 396, the augmented reality compute device 102 may determine one or more user-referenced attributes based the user context. Additionally or alternatively, in block 398, the augmented reality compute device 102 may determine one or more user-referenced attributes based on historic user interactions. Additionally or alternatively, in block 400, the augmented reality compute device 102 may learn or interpret one or more user-referenced attributes over time using machine learning techniques.

Figure 7:
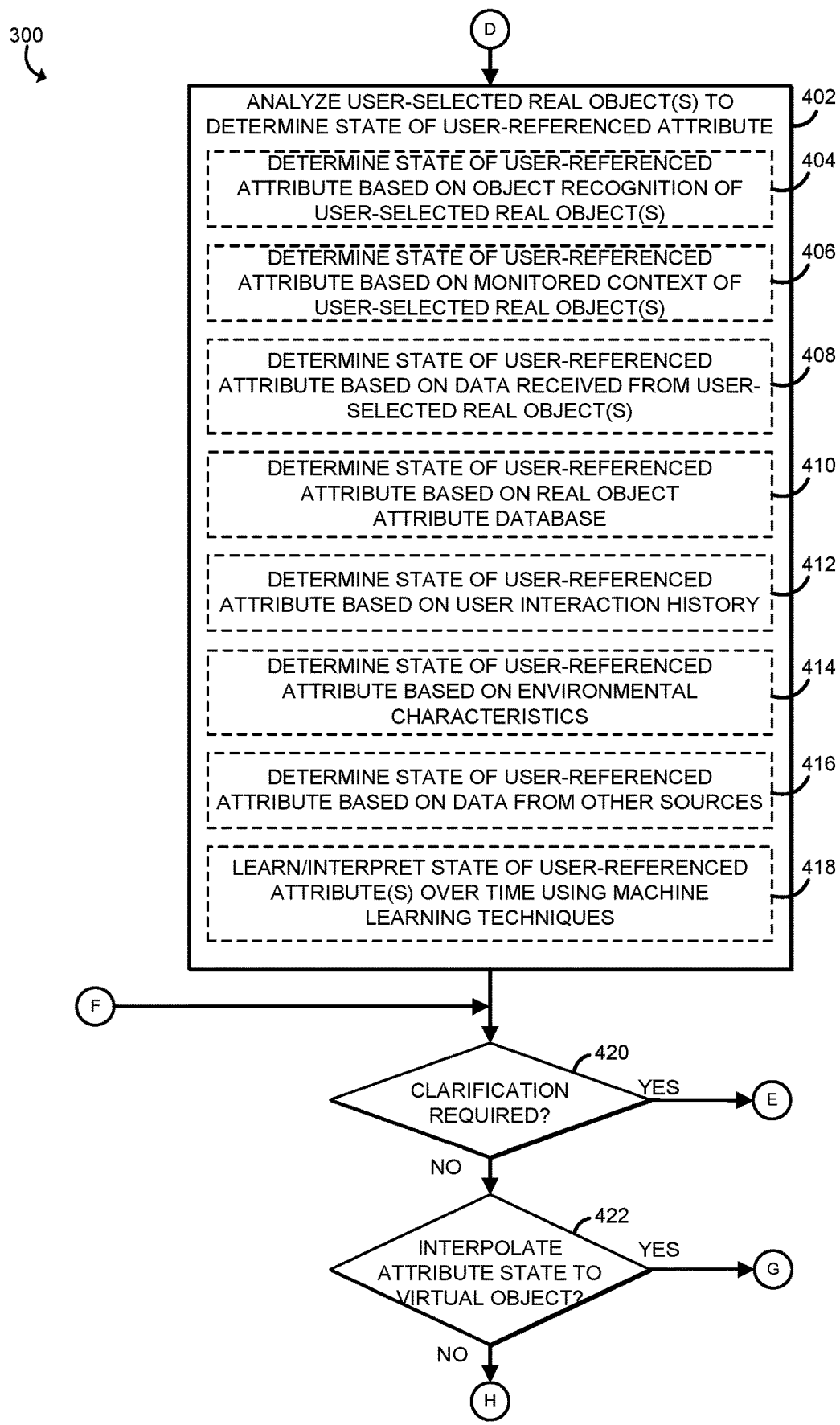
Figure 8:
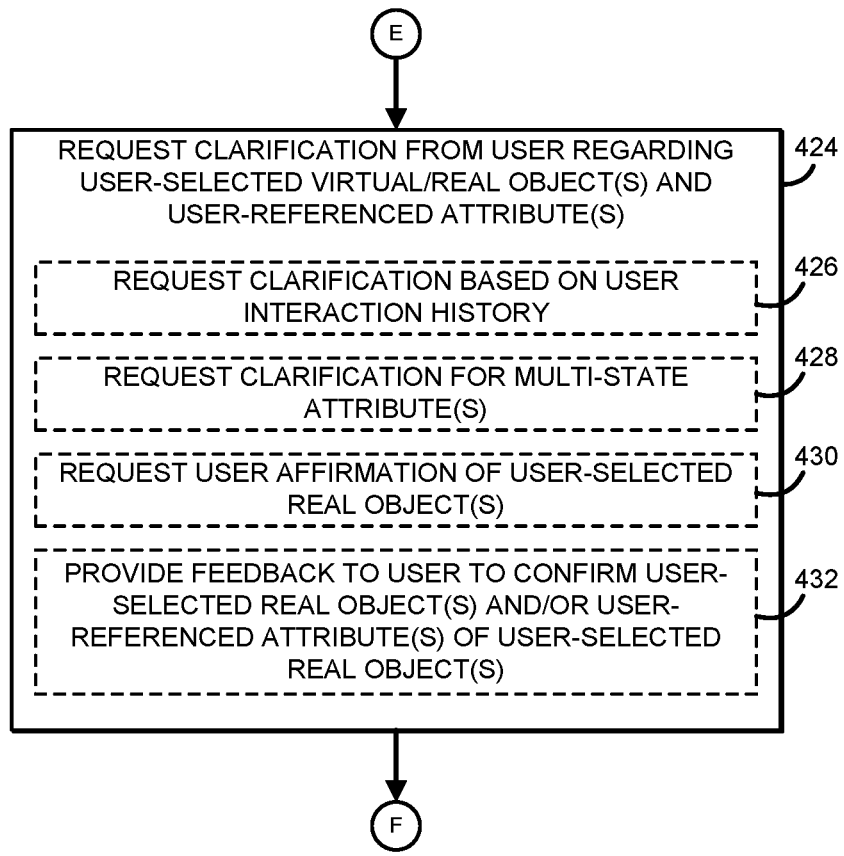

In block 402 of FIG. 7, the augmented reality compute device 102 analyzes the user-selected real object(s) to determine a state of the corresponding user-referenced attribute. To do so, the augmented reality compute device 102 may perform one or more functions described in previous blocks 332-342 for user-selected real object(s) instead of the real object(s) identified by the augmented reality compute device 102 in block 328. In some embodiments, the augmented reality compute device 102 may determine a state of the user-referenced attribute based on the object recognition processing of the corresponding user-selected real object as indicated in block 404. Additionally or alternatively, in block 406, the augmented reality compute device 102 may determine a state of the user-referenced attribute based on a monitored context of user-selected real object(s). Additionally or alternatively, in block 408, the augmented reality compute device 102 may determine a state of user-referenced attribute based on data received from user-selected real object(s). Additionally or alternatively, in block 410, the augmented reality compute device 102 may determine a state of user-referenced attribute based on the real object attribute database 212. Additionally or alternatively, in block 412, the augmented reality compute device 102 may determine a state of user-referenced attribute based on the user interaction history. Additionally or alternatively, in block 414, the augmented reality compute device 102 may determine a state of user-referenced attribute based on the environmental characteristics. Additionally or alternatively, in block 416, the augmented reality compute device 102 may determine a state of user-referenced attribute based data from other sources. The other sources may include broadcast contents that is streamed into the system or captured within the real environment and ambient conditions such as weather. Additionally or alternatively, in block 418, the augmented reality compute device 102 may learn or interpret a state of user-referenced attribute over time using the machine learning techniques.

In block 420, the augmented reality compute device 102 determines whether a clarification is required. For example, do to various reasons, the user selection of the virtual object, the real object, and/or the associated attributes may be unclear. If so, the method 300 skips ahead to block 424 shown in FIG. 8 to request a clarification from the user regarding one or more user-selected virtual or real objects and the user-referenced attribute(s). To do so, in some embodiments, the augmented reality compute device 102 may request a clarification based on the user interaction history as indicated in block 426. For example, the augmented reality compute device 102 may ask the user "do you want the stuffed bear to have the color of the frog as last week?"

Additionally or alternatively, in block 428, the augmented reality compute device 102 may request a clarification for multi-state attributes. That is, if the user-selected virtual objects have multiple states of the same attribute, the augmented reality compute device 102 may further ask the user about the specific state of the attribute. For example, if the attribute assignment command was to "change the virtual stuffed bear to have the color of that apple," which includes a gradient color and patches. In response, the augmented reality compute device 102 may ask the user about a color selection and a logic of the color selection and whether to keep the texture.

Additionally or alternatively, in block 430, the augmented reality compute device 102 may request a user affirmation of one or more user-selected real objects. For example, if the user pointed to a real object whose attribute(s) is to be copied, the augmented reality compute device 102 may request the user to confirm the selection of the real object by touching the real object.

Additionally or alternatively, in block 432, the augmented reality compute device 102 may provide a feedback to the user to confirm that the user-selected real object(s) and/or the user-referenced attribute(s) of the user-selected real object(s). For example, the augmented reality compute device 102 may use a display output device 142 (e.g., a laser pointer) to point to the real object to confirm that the user selection.

Referring back to block 420 in FIG. 7, if the augmented reality compute device 102 determines that a clarification is not required, the method 300 advances to block 422 to determine whether to interpolate the attribute state to the corresponding virtual object. That is, the state of an attribute of a real object may not be directly equivalent or assignable to the user-selected attribute of the virtual object (e.g., the gait of a four legged animal may not be directly applicable to a two legged virtual animal). If not, the method 300 skips ahead to block 446 to update the state of the user-referenced attribute(s) of the user-selected virtual object(s). If, however, the augmented reality compute device 102 determines to interpolate the attribute state to the corresponding virtual object, the method 300 advances to block 434 of FIG. 9.

Figure 9:
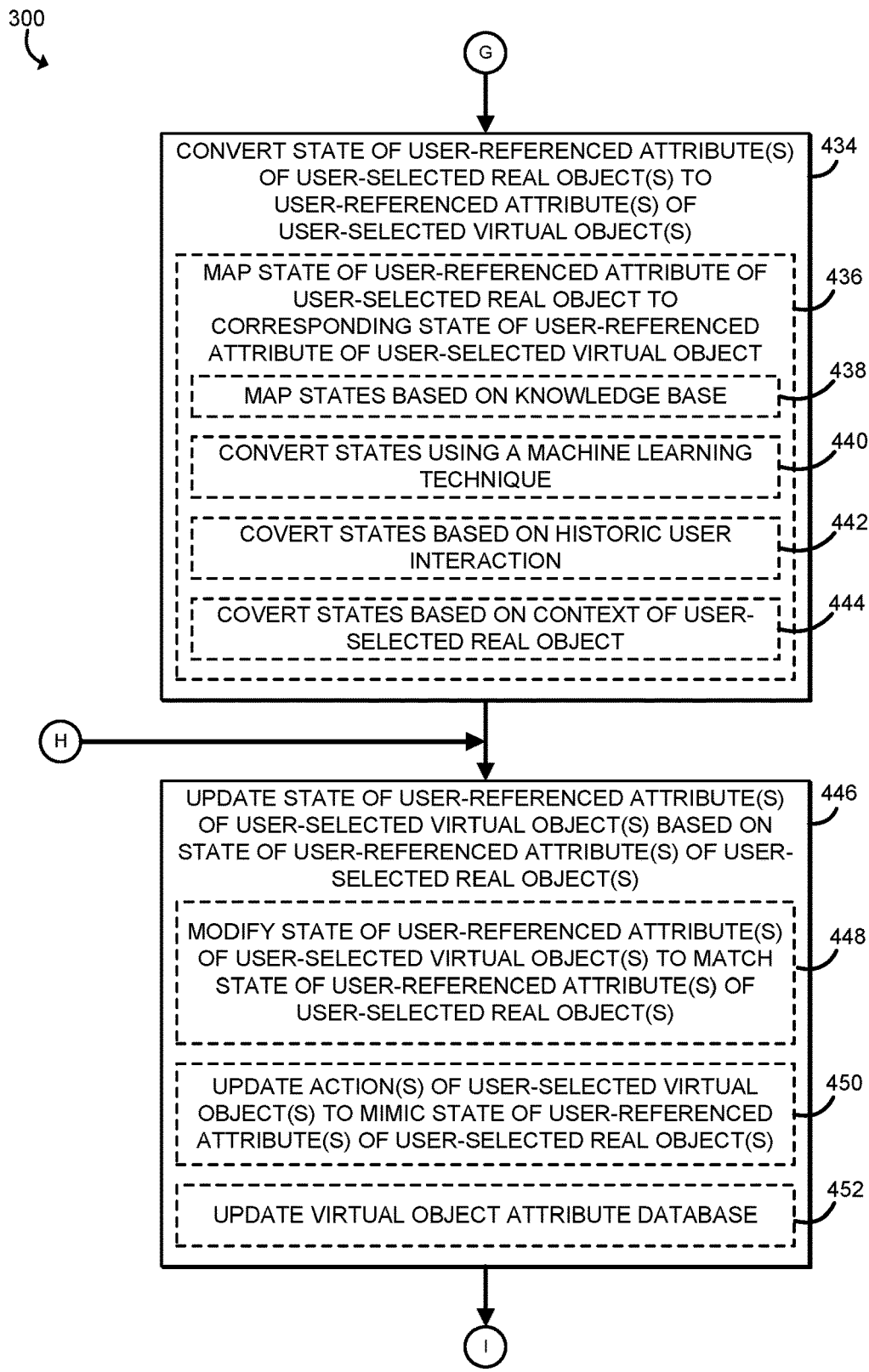

In block 434 shown in FIG. 9, the augmented reality compute device 102 converts the state of the user-referenced attribute(s) of the user-selected real object(s) to the user-referenced attribute(s) of the user-selected virtual object(s). In some embodiments, the augmented reality compute device 102 may map the state of the user-referenced attribute of the use-selected real object to a corresponding state of the user-referenced attribute of the user-selected virtual object as indicated in block 436. To do so, in block 438, the augmented reality compute device 102 may map the states based on a knowledge base. For example, the attribute assignment command may include "I want my virtual bear Oscar to mimic movements of a car." In such an example, the augmented reality compute device 102 may determine that the user-referenced attribute is the movement of the virtual bear Oscar. Subsequently, the augmented reality compute device 102 may determine that the virtual bear Oscar can mimic the movement of the car, but the virtual bear Oscar would be running instead of moving like a car based on the characteristics of the attributes associated with the virtual bear Oscar.

Additionally or alternatively, in block 440, the augmented reality compute device 102 may convert the states using a machine learning technique. For example, the augmented reality compute device 102 may map the state of the user-referenced attribute associated with the user-selected real object to the state of the user-referenced attribute associated with the user-selected virtual object based on an intelligent ontology based knowledge search.

Additionally or alternatively, in block 442, the augmented reality compute device 102 may convert the states based on the historic user interaction. For example, if the user indicates that "I want the color of my virtual bear Oscar to match the color of that stuffed frog," the augmented reality compute device 102 first determines that the color of the stuffed frog is green. However, the exact shade of green of the stuffed frog may not be included in the color palette of the augmented reality compute device 102. In such case, the augmented reality compute device 102 may determine how the user has previously responded when the real object had the similar shade of green as the stuffed frog. Additionally or alternatively, in block 444, the augmented reality compute device 102 may convert the states based on the context of the user-selected real object.

In block 446, the augmented reality compute device 102 updates the state of the user-referenced attribute(s) of the user-selected virtual object(s) based on the state of the user-referenced attribute(s) of the user-selected real object(s). To do so, in some embodiments, the augmented reality compute device 102 may modify the state of the user-referenced attribute(s) of the user-selected virtual object(s) to match the state of the user-referenced attribute(s) of the user-selected real object(s) as indicated in block 448. Additionally or alternatively, in block 450, the augmented reality compute device 102 may update the action(s) of the user-selected virtual object(s) to mimic the state of the user-referenced attribute(s) of the user-selected real object(s). Additionally or alternatively, in block 452, the augmented reality compute device 102 may update the virtual object attribute database 210 in response to determining that one or more attributes of the virtual object(s) have been modified. The method 300 subsequently loops back to block 324 in which the augmented reality compute device 102 continues to render the virtual object with any new attribute states and performing the actions associated with that virtual object.

EXAMPLES

Illustrative examples of the technologies disclosed herein are provided below. An embodiment of the technologies may include any one or more, and any combination of, the examples described below.

Example 1 includes a compute device for virtual attribute assignment, the compute device comprising an augmented reality renderer to render one or more virtual objects in an augmented reality space; and a user input analyzer to receive an attribute assignment command from a user; analyze the attribute assignment command to determine a user-selected virtual object, a user-referenced attribute of the user-selected virtual object, a user-selected real object, and a user-referenced attribute of the user-selected real object; determine a state of the user-referenced attribute of the user-selected real object; and update a state of the user-referenced attribute of the user-selected virtual object based on the state of the user-referenced attribute of the user-selected real object.

Example 2 includes the subject matter of Example 1, and further including a virtual object manager to generate a virtual object and identify an assignable attribute of the virtual object, wherein the virtual object is the user-selected virtual object and to update the state of the user-referenced attribute of the user-selected virtual object comprises to update a state of the assignable attribute based on the state of the user-referenced attribute of the user-selected real object.

Example 3 includes the subject matter of any of Examples 1 and 2, and further including a real object manager to identify one or more real objects in vicinity of one or more virtual objects rendered in the real environment and determine an attribute and a state of the attribute of the identified real object.

Example 4 includes the subject matter of any of Examples 1-3, and wherein the user input analyzer is further to determine, in response to an analysis of the attribute assignment command, whether a clarification of the attribute assignment command is required and request a clarification from the user regarding the virtual object and the attribute associated with the virtual object.

Example 5 includes the subject matter of any of Examples 1-4, and wherein to determine whether the clarification of the attribute assignment command is required comprises to determine whether the attribute associated with the real object is a multi-state attribute.

Example 6 includes the subject matter of any of Examples 1-5, and wherein to request the clarification from the user comprises to request a user to perform a gesture to affirm the real object.

Example 7 includes the subject matter of any of Examples 1-6, and wherein to update the state of the user-referenced attribute of the user-selected virtual object comprises to convert the state of the user-referenced attribute of the user-selected real object to a corresponding state of the user-referenced attribute of the user-selected virtual object.

Example 8 includes the subject matter of any of Examples 1-7, and wherein to convert the state of the user-referenced attribute of the user-selected real object to the corresponding state of the user-referenced attribute of the user-elected virtual object comprises to map the state of the user-referenced attribute of the user-selected real object to a corresponding state of the user-referenced attribute of the user-selected virtual object.

Example 9 includes the subject matter of any of Examples 1-8, and wherein to update the state of the user-referenced attribute of the user-selected virtual object comprises to modify the state of the user-referenced attribute of the user-selected virtual object based on the state of the user-referenced attribute associated with the user-selected real object; and render the user-selected virtual object having a modified state of the user-referenced attribute.

Example 10 includes a method for virtual attribute assignment, the method comprising receiving, by the compute device, an attribute assignment command from a user; analyzing, by the compute device, the attribute assignment command to determine a user-selected virtual object, a user-referenced attribute of the user-selected virtual object, a user-selected real object, and a user-referenced attribute of the user-selected real object; determining, by the compute device, a state of the user-referenced attribute of the user-selected real object; and updating, by the compute device, a state of the user-referenced attribute of the user-selected virtual object based on the state of the user-referenced attribute of the user-selected real object.

Example 11 includes the subject matter of Example 10, and further including generating, by the compute device, a virtual object in an augmented reality space; and identifying, by the compute device, an assignable attribute of the virtual object, wherein the virtual object is the user-selected virtual object and updating the state of the user-referenced attribute of the user-selected virtual object comprises updating a state of the assignable attribute based on the state of the user-referenced attribute of the user-selected real object.

Example 12 includes the subject matter of any of Examples 10 and 11, and further including identifying, by the compute device and prior to receiving the attribute assignment command, one or more real objects in vicinity of one or more virtual objects rendered in the real environment; and determining, by the compute device, an attribute and a state of the attribute of the identified real object.

Example 13 includes the subject matter of any of Examples 10-12, and further including determining, in response to an analysis of the attribute assignment command and by the compute device, whether a clarification of the attribute assignment command is required; and requesting, by the compute device, a clarification from the user regarding the virtual object and the attribute associated with the virtual object.

Example 14 includes the subject matter of any of Examples 10-13, and wherein determining whether the clarification of the attribute assignment command is required comprises determining, by the compute device, whether the attribute associated with the real object is a multi-state attribute.

Example 15 includes the subject matter of any of Examples 10-14, and wherein requesting the clarification from the user comprises requesting, by the compute device, a user to perform a gesture to affirm the real object.

Example 16 includes the subject matter of any of Examples 10-15, and wherein updating the state of the user-referenced attribute of the user-selected virtual object comprises converting, by the compute device, the state of the user-referenced attribute of the user-selected real object to a corresponding state of the user-referenced attribute of the user-selected virtual object.

Example 17 includes the subject matter of any of Examples 10-16, and wherein converting the state of the user-referenced attribute of the user-selected real object to the corresponding state of the user-referenced attribute of the user-elected virtual object comprises mapping, by the compute device, the state of the user-referenced attribute of the user-selected real object to a corresponding state of the user-referenced attribute of the user-selected virtual object.

Example 18 includes the subject matter of any of Examples 10-17, and wherein updating the state of the user-referenced attribute of the user-selected virtual object comprises modifying, by the compute device, the state of the user-referenced attribute of the user-selected virtual object based on the state of the user-referenced attribute associated with the user-selected real object; and rendering, by the compute device, the user-selected virtual object having a modified state of the user-referenced attribute.

Example 19 includes one or more machine-readable storage media comprising a plurality of instructions stored thereon that, when executed, causes a compute device to receive an attribute assignment command from a user; analyze the attribute assignment command to determine a user-selected virtual object, a user-referenced attribute of the user-selected virtual object, a user-selected real object, and a user-referenced attribute of the user-selected real object; determine a state of the user-referenced attribute of the user-selected real object; and update a state of the user-referenced attribute of the user-selected virtual object based on the state of the user-referenced attribute of the user-selected real object.

Example 20 includes the subject matter of Example 19, and further including a plurality of instructions that in response to being executed cause the compute device to generate a virtual object in an augmented reality space; and identify an assignable attribute of the virtual object, wherein the virtual object is the user-selected virtual object and to update the state of the user-referenced attribute of the user-selected virtual object comprises to update a state of the assignable attribute based on the state of the user-referenced attribute of the user-selected real object.

Example 21 includes the subject matter of any of Examples 19 and 20, and further including a plurality of instructions that in response to being executed cause the compute device to identify, prior to receiving the attribute assignment command, one or more real objects in vicinity of one or more virtual objects rendered in the real environment; and determine an attribute and a state of the attribute of the identified real object.

Example 22 includes the subject matter of any of Examples 19-21, and further including a plurality of instructions that in response to being executed cause the compute device to determine, in response to an analysis of the attribute assignment command, whether a clarification of the attribute assignment command is required; and request a clarification from the user regarding the virtual object and the attribute associated with the virtual object.

Example 23 includes the subject matter of any of Examples 19-22, and wherein to update the state of the user-referenced attribute of the user-selected virtual object comprises to convert the state of the user-referenced attribute of the user-selected real object to a corresponding state of the user-referenced attribute of the user-selected virtual object.

Example 24 includes the subject matter of any of Examples 19-23, and wherein to convert the state of the user-referenced attribute of the user-selected real object to the corresponding state of the user-referenced attribute of the user-elected virtual object comprises to map the state of the user-referenced attribute of the user-selected real object to a corresponding state of the user-referenced attribute of the user-selected virtual object.

Example 25 includes the subject matter of any of Examples 19-24, and wherein to update the state of the user-referenced attribute of the user-selected virtual object comprises to modify the state of the user-referenced attribute of the user-selected virtual object based on the state of the user-referenced attribute associated with the user-selected real object; and render the user-selected virtual object having a modified state of the user-referenced attribute.

The invention claimed is:

1. A compute device for virtual attribute assignment, the compute device comprising:
   an augmented reality renderer to render one or more virtual objects in an augmented reality space; and
   a user input analyzer to:
      receive an attribute assignment command from a user that identifies a user-selected virtual object, a user-referenced attribute of the user-selected virtual object, a user-selected real object, and a user-referenced attribute of the user-selected real object;
      analyze the attribute assignment command to determine:
         the user-selected virtual object identified by the user in the attribute assignment command, wherein the user-selected virtual object identified in the attribute assignment command has a plurality of user-assignable attributes;
         the user-referenced attribute of the user-selected virtual object, wherein the user-referenced attribute of the user-selected virtual object is one of the plurality of user-assignable attributes of the user-selected virtual object;
         the user-selected real object identified by the user in the attribute assignment command; and
         the user-referenced attribute of the user-selected real object, wherein the user-referenced attribute of the user-selected real object is identified by the user in the attribute assignment command;
      determine, in response to the attribute assignment command, a state of the user-referenced attribute of the user-selected real object; and
      copy, in response to the attribute assignment command, the state of the user-referenced attribute of the user-selected real object to a state of the user-referenced attribute of the user-selected virtual object.

2. The compute device of claim 1, further including a virtual object manager to generate, in response to receipt of the attribute assignment command, the user-selected virtual object and identify an assignable attribute of the user-selected virtual object, wherein the user input analyzer is to update a state of the assignable attribute based on the state of the user-referenced attribute of the user-selected real object to copy the state of the user-reference attribute of the user-selected real object.

3. The compute device of claim 1, further including a real object manager to:
   identify one or more real objects in a real environment, the one or more real objects in a vicinity of the one or more virtual objects rendered in the augmented reality space: and
   determine an attribute and a state of the attribute of at least one of the one or more real objects.

4. The compute device of claim 1, wherein the user input analyzer is to determine, in response to an analysis of the attribute assignment command, whether a clarification of the attribute assignment command is required and to request a clarification from the user regarding the user-selected virtual object and the attribute associated with the user-selected virtual object.

5. The compute device of claim 4, wherein the user input analyzer is to determine whether the attribute associated with the user-selected real object is a multi-state attribute to determine whether the clarification of the attribute assignment command is required.

6. The compute device of claim 4, wherein the user input analyzer is to request a user to perform a gesture to affirm the user-selected real object.

7. The compute device of claim 1, wherein the user input analyzer is to copy the state of the user-referenced attribute of the user-selected real object by:
   modifying the state of the user-referenced attribute of the user-selected virtual object based on the state of the user-referenced attribute associated with the user-selected real object; and
   rendering the user-selected virtual object having a modified state of the user-referenced attribute.

8. The compute device of claim 1, wherein the attribute assignment command is a voice command.

9. The compute device of claim 1, wherein the plurality of user-assignable attributes includes at least one of color, pattern, texture, emitted sound, size and shape.

10. The compute device of claim 1, wherein the user-referenced attribute of the user-selected virtual object is a color of the user-selected virtual object.

11. The compute device of claim 1, wherein the user-selected virtual object is not a same type of object as the user-selected real object.

12. A method for virtual attribute assignment, the method comprising:
   rendering, with a compute device, one or more virtual objects in an augmented reality space;

receiving, at the compute device, an attribute assignment command from a user that identifies a user-selected virtual object, a user-referenced attribute of the user-selected virtual object, a user-selected real object, and a user-referenced attribute of the user-selected real object;

analyzing, by the compute device, the attribute assignment command to determine (1) the user-selected virtual object, (2) the user-referenced attribute of the user-selected virtual object, (3) the user-selected real object, and (4) the user-referenced attribute of the user-selected real object, wherein the user-selected virtual object has a plurality of user-assignable attributes, and the user-referenced attribute of the user-selected virtual object is one of the plurality of user-assignable attributes of the user-selected virtual object; and in response to the attribute assignment command:
determining, by the compute device, a state of the user-referenced attribute of the user-selected real object; and
copying, by the compute device, the state of the user-referenced attribute of the user-selected real object to a state of the user-referenced attribute of the user-selected virtual object.

13. The method of claim 12, further including:
generating, by the compute device, the user-selected virtual object in an augmented reality space; and
identifying, by the compute device, an assignable attribute of the user-selected virtual object, wherein the copying of the state of the user-referenced attribute of the user-selected real object includes updating a state of the assignable attribute based on the state of the user-referenced attribute of the user-selected real object.

14. The method of claim 12, further including:
identifying, by the compute device and prior to receiving the attribute assignment command, one or more real objects in a real environment, the one or more real objects in a vicinity of the one or more virtual objects rendered in the augmented reality space; and
determining, by the compute device, an attribute and a state of the attribute of at least one of the one or more real objects.

15. The method of claim 12, further including:
determining, determining, in response to an analysis of the attribute assignment command and by the compute device, whether a clarification of the attribute assignment command is required; and
requesting, by the compute device, a clarification from the user regarding the user-selected virtual object and the attribute associated with the user-selected virtual object.

16. The method of claim 15, wherein the determining of whether the clarification of the attribute assignment command is required includes determining, by the compute device, whether the attribute associated with the user-selected real object is a multi-state attribute.

17. The method of claim 15, wherein the requesting of the clarification from the user includes requesting, by the compute device, a user to perform a gesture to affirm the user-selected real object.

18. The method of claim 12, wherein the copying of the state of the user-referenced attribute of the user-selected real object includes converting, by the compute device, the state of the user-referenced attribute of the user-selected real object to a corresponding state of the user-referenced attribute of the user-selected virtual object.

19. The method of claim 18, wherein the converting of the state of the user-referenced attribute of the user-selected real object to the corresponding state of the user-referenced attribute of the user-selected virtual object includes mapping, by the compute device, the state of the user-referenced attribute of the user-selected real object to a corresponding state of the user-referenced attribute of the user-selected virtual object.

20. One or more non-transitory machine-readable storage media comprising a plurality of instructions stored thereon that, when executed, causes a compute device to:
render one or more virtual objects in an augmented reality space;
receive an attribute assignment command from a user that identifies a user-selected virtual object, a user-referenced attribute of the user-selected virtual object, a user-selected real object, and a user-referenced attribute of the user-selected real object;
analyze the attribute assignment command to determine (1) the user-selected virtual object, (2) the user-referenced attribute of the user-selected virtual object, (3) the user-selected real object, and (4) the user-referenced attribute of the user-selected real object, wherein the user-selected virtual object has a plurality of user-assignable attributes, and the user-referenced attribute of the user-selected virtual object is one of the plurality of user-assignable attributes of the user-selected virtual object; and
in response to the attribute assignment command:
determine a state of the user-referenced attribute of the user-selected real object; and
copy the state of the user-referenced attribute of the user-selected real object to a state of the user-referenced attribute of the user-selected virtual object.

21. The one or more non-transitory machine-readable storage media of claim 20, wherein the instructions cause the compute device to:
generate the user-selected virtual object in an augmented reality space;
identify an assignable attribute of the user-selected virtual object; and
update a state of the assignable attribute based on the state of the user-referenced attribute of the user-selected real object to copy the state of the user-referenced attribute of the user-selected real object.

22. The one or more non-transitory computer-readable storage media of claim 20, wherein the instructions cause the compute device to:
identify, prior to receiving the attribute assignment command, one or more real objects in a vicinity of the one or more virtual objects rendered in the augmented reality space; and
determine an attribute and a state of the attribute of at least one of the one or more real objects.

23. The one or more non-transitory computer-readable storage media of claim 20, wherein the instructions cause the compute device to:
determine, in response to an analysis of the attribute assignment command, whether a clarification of the attribute assignment command is required; and
request a clarification from the user regarding the user-selected virtual object and the attribute associated with the user-selected virtual object.

24. The one or more non-transitory computer-readable storage media of claim 20, wherein the instructions case the compute device to convert the state of the user-referenced attribute of the user-selected real object to a corresponding state of the user-referenced attribute of the user-selected virtual object.

25. The one or more non-transitory machine-readable storage media of claim 24, wherein the instructions case the compute device to map the state of the user-referenced attribute of the user-selected real object to a corresponding state of the user-referenced attribute of the user-selected virtual object.

* * * * *

UNITED STATES PATENT AND TRADEMARK OFFICE
CERTIFICATE OF CORRECTION

| | | |
|---|---|---|
| PATENT NO. | : 10,970,937 B2 | |
| APPLICATION NO. | : 15/971554 | |
| DATED | : April 6, 2021 | |
| INVENTOR(S) | : Anderson et al. | |

It is certified that error appears in the above-identified patent and that said Letters Patent is hereby corrected as shown below:

In the Claims

In Column 21, Claim 15, Line 45, delete "determining,".

Signed and Sealed this
Twenty-sixth Day of April, 2022

*Katherine Kelly Vidal*

Katherine Kelly Vidal
*Director of the United States Patent and Trademark Office*